Oct. 15, 1929.  W. R. BARRETT  1,732,149
FABRIC CUTTER
Filed June 27, 1928    2 Sheets-Sheet 1

WITNESSES

INVENTOR
William R. Barrett
BY
ATTORNEY

Oct. 15, 1929.  W. R. BARRETT  1,732,149
FABRIC CUTTER
Filed June 27, 1928   2 Sheets-Sheet 2

WITNESSES

INVENTOR
William R. Barrett
BY
ATTORNEY

Patented Oct. 15, 1929

1,732,149

UNITED STATES PATENT OFFICE

WILLIAM R. BARRETT, OF NEW YORK, N. Y.

FABRIC CUTTER

Application filed June 27, 1928. Serial No. 288,702.

This invention relates to a fabric cutter, and relates more particularly to a fabric cutter of the type disclosed in United States Letters Patent No. 1,513,688, granted to me.

The fabric cutter of the type under consideration includes a carriage which travels relatively to a fabric support, a cutter which travels on the carriage in cutting relation to the fabric support, and power and driving mechanism which operates to move the carriage step by step, and also to operate the cutter intermittently, in timed accord, so that the carriage will travel a predetermined distance after each cutting operation, for the purpose of cutting a piece of fabric on a bias, into strips of predetermined lengths and widths.

The principal object of the present invention is to provide improvements in the construction and operation of cutters or machines of the indicated character, by virtue of which a piece of fabric or like material of a certain width, may be accurately cut on a bias, at any desired angle within a certain range, for the purpose of obtaining strips of various lengths and widths.

The nature of the invention and its distinguishing features and advantages will appear when the following specification is read in connection with the accompanying drawing, in which—

Figure 1:
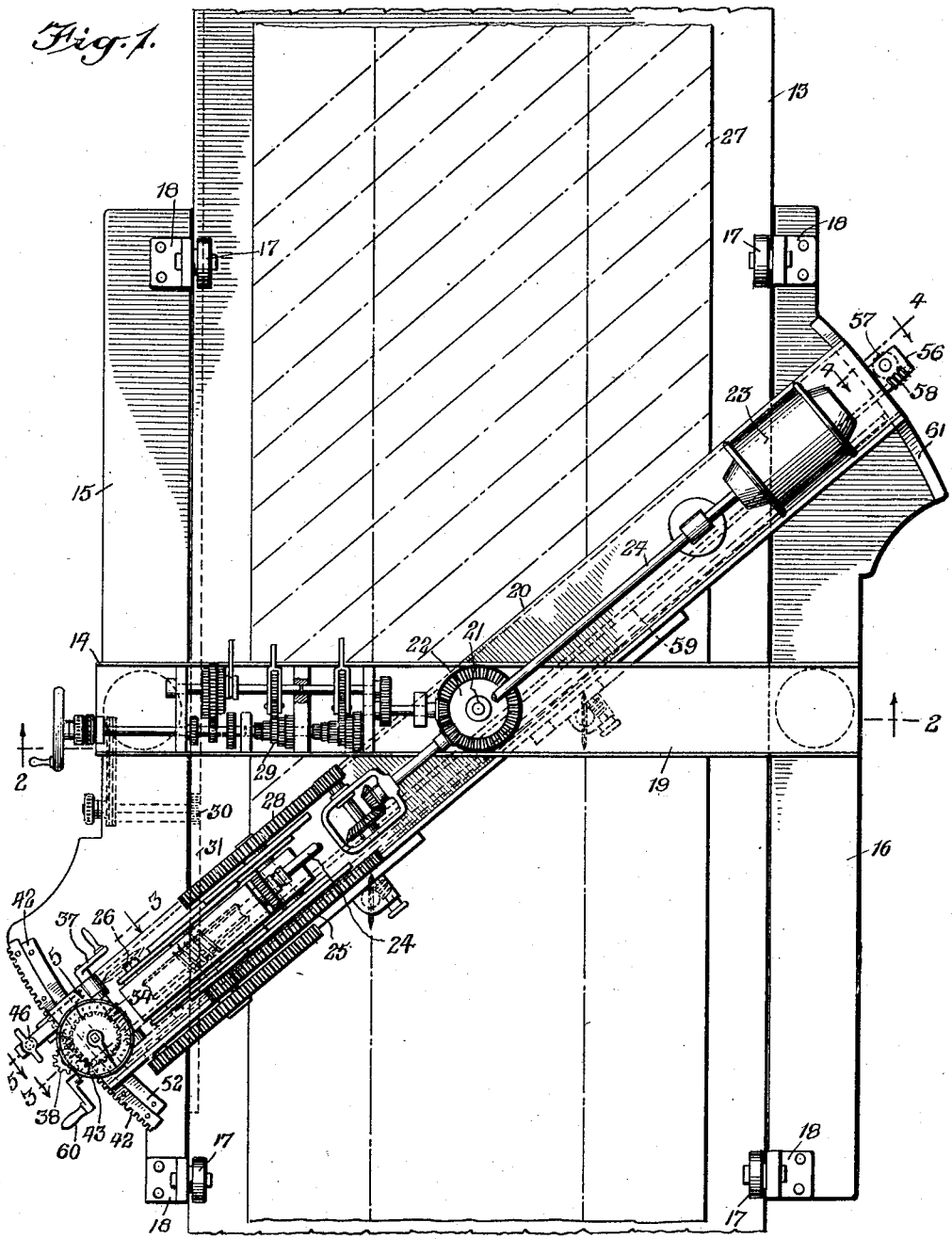
Figure 1 is a plan view of the fabric cutter embodying the features of the present invention.
Figure 2:
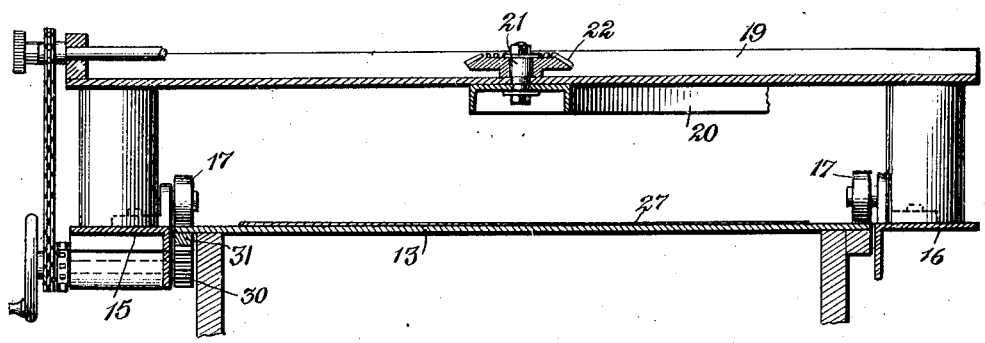
Fig. 2 is a transverse sectional view taken on the line 2—2 of Fig. 1.
Figures 3, 4:
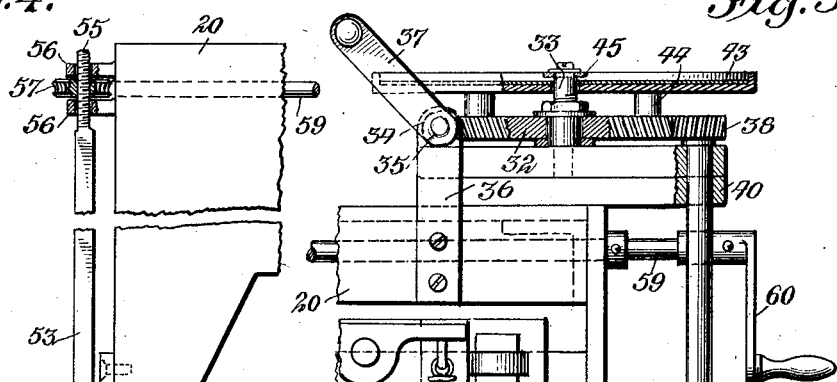
Fig. 3 is a sectional view taken on the line 3—3 of Fig. 1, the same being shown on an enlarged scale.
Fig. 4 is a sectional view taken on the line 4—4 of Fig. 1 on an enlarged scale.
Figure 5:
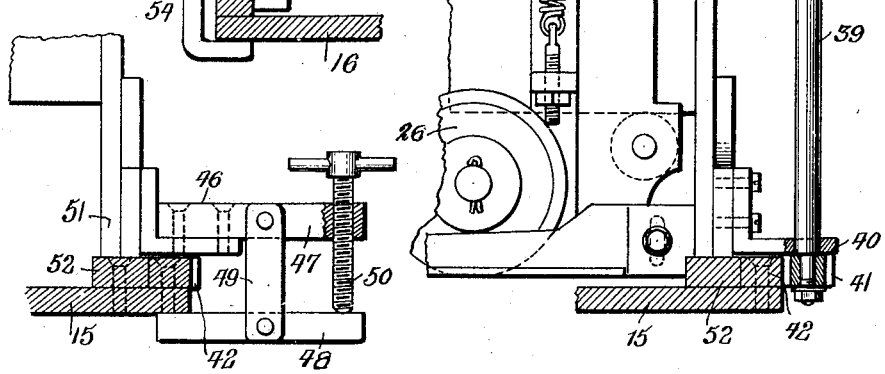
Fig. 5 is a sectional view taken on the line 5—5 of Fig. 1 on an enlarged scale.

Referring now more particularly to the drawings, it will be apparent that, there is shown a fabric cutter which includes a fabric support 13 which will be mounted on a suitable frame structure. A carriage 14 is associated with the fabric support 13 for relative longitudinal movement with respect thereto. The carriage 14 includes two side members 15 and 16 arranged respectively at opposite sides of the fabric support 13, and movably mounted on the fabric support by means of rollers or wheels 17 each being mounted on a bracket or member 18 attached to its related side member. A bridge 19 is arranged transversely of the fabric support 13 and is carried by the side members 15 and 16 to which it is fixed, the said bridge 19 being disposed above the fabric support 13. A beam 20 is pivotally mounted on the bridge 19, and this is accomplished by the use of an arbor 21 which serves as a pivot for the beam 20, and also as a means on which a bevel gear 22 rotates. The beam 20 is suspended from the bridge 19 below the same, and the arbor 21 is positioned centrally of the bridge, and is also located centrally with respect to the fabric support 13. A prime mover or electric motor 23 is arranged on one end of the beam 20, the shaft 24 of which operates motion transmission mechanism 25 carried by the beam 20. The said mechanism 25 operates to cause a rotary cutter 26 to travel intermittently in opposite directions longitudinally of the beam 20, and therefore across the fabric support 13 to cut the fabric indicated at 27. The mechanism 25 also serves to intermittently drive the bevel gear 22, and this is accomplished through the intervention of gearing 28. Selective motion transmission mechanism 29 supported mainly by the bridge 19 and in part by the side member 15 transmits the intermittent motion of the gear 22, to the pinion 30 of the mechanism 29. The said pinion 30 meshes with a rack 31 secured along one of the longitudinal edges of the fabric support 13. The carriage 14 is thus moved step by step, and the degree of each step is governed by the mechanism 29 which may be controlled manually for the purpose of changing the distance of travel of the carriage in its intermittent movement. The mechanism 29 serves for the purpose of obtaining strips of different widths. The operation of the cutter 26 and the movement of the carriage 14 is in timed accord, the provision being such that the cutter 26 travels across the fabric support to cut the fabric followed immediately by the carriage moving a predetermined distance, whereupon the cutter 26 travels in an opposite direction, and this action is repeated continually for the purpose of cutting the fabric 27 on the bias into strips of predetermined length and width. This feature has been fully disclosed in the Letters Patent hereinbefore mentioned.

In order to cut the fabric into strips of various lengths, means is provided for changing the angular position of the beam 20. The said means includes a worm gear 32 rotatable on a stub shaft 33 secured to the beam 20. The worm gear 32 is rotated by a worm 34 on a shaft 35 journaled in suitable bearings 36 carried by the beam 20. The shaft 35 has a crank handle 37 for the purpose of rotating the shaft 35 to turn the worm 34. The worm gear 32 meshes with a gear 38 on the upper end of a shaft 39 journaled in bearings 40. The lower end of the shaft 39 has secured thereto a pinion 41 which meshes with the teeth of an arcuate rack 42 secured to the side member 15. It will now be understood that when the crank handle 37 is manipulated movement will be imparted to the beam 20 to change the angular position of the beam 20. Consequently the cutter 26 will be made to travel across the fabric support 13 at an angle corresponding to the angle of disposition of the beam 20. In this way strips of various lengths may be cut from the fabric.

In order to indicate the degree of movement of the beam 20 and in order to guide the operator in making the desired adjustment to obtain strips of fabric of predetermined lengths, there is provided a dial 43 which is secured to the worm gear 32, as at 44 to turn therewith. A pointer 45 which serves in conjunction with the dial 43 is fixedly mounted on the upper end of the shaft 33.

In order to hold the beam 20 against movement in the different adjusted positions, there is provided means presently to be described. One end of the beam 20 carries a clamp 46 which may be of any preferred construction, and in the present instance consists of a relatively fixed bracket 47 on the beam 20, a clamping member 48 swingingly mounted on the bracket 47, as at 49, and a pressure screw 50 adjustable on the bracket 47, and which exerts pressure on the clamping member 48, the latter being adapted to engage the under side of an edge portion of the side member 15 to cooperate with a fixed depending member 51 on the beam 20, which contacts with a track member 52 secured to the side member 15, to set up a clamping action. Thus provision is made for holding one end of the beam 20 against movement. The opposite end of the beam 20 is also held against movement, and this is accomplished by the provision of a clamping member 53 arranged for up and down movement in a bracket 54 secured to the beam 20. The upper end 55 of the clamping member 53 is cross sectionally round and threaded. The said end 55 extends through apertured lugs 56 secured to the end of the beam 20. A worm gear 57 is threaded on the end 55, and is disposed between the lugs 56 to prevent the gear 57 from moving longitudinally with respect to the end 55. A worm 58 meshes with the gear 57, and said worm is fast on one end of a shaft 59 supported in suitable bearings carried by the beam 20, and the opposite end of the shaft 59 has a crank handle 60. The clamping member 53 is adapted to engage an edge portion of the side member 16, and said clamping member 53 operates with a portion of the beam 20 which is in contact with an arcuate track member 61 on the side member 16, to set up the clamping action. It will be understood that when the crank handle 60 is manipulated, the clamping member 53 may be moved into and out of clamping engagement with the edge portion of the side member 16 to hold the related end of the beam 20 against movement, or to release the same. The crank handle 60 is disposed adjacent the end of the beam having the clamp 46, and crank handle 37 so that all adjustments may be made from one side of the machine.

From the foregoing it will be understood that the beam 20 which carries the cutter 26, the power means 23, and motion transmission means 25, is guided for movement to different angular positions, making it possible to cut a piece of fabric or like material on a bias, at any desired angle within a limited range, for the purpose of obtaining strips of various lengths; that motion is transmitted from the power means 23 to the mechanism 29, regardless of the adjustment of the beam 20, to move the carriage 14, and therefore the beam 20 and cutter 26 longitudinally of the fabric support 13, to obtain the desired width of fabric strips; that means is provided for adjusting the beam 20 and appurtenances carried thereby for the intended purpose; and that means is provided for holding the beams 20 and appurtenances carried thereby in different angular positions of adjustment.

It is to be understood that the invention is not restricted to the precise arrangement of parts shown and described, as details of construction may be modified and rearranged without departing from the spirit of the invention, the scope of which is limited only by the terms of the appended claims.

I claim:

1. In a machine for cutting material into strips, a support for material to be cut, a beam mounted for movement along said support and also mounted for guided movement to different angular positions with respect to said support, a cutter mounted on said beam for longitudinal movement thereon, for the purpose of cutting the material on a bias, means operable to accurately adjust the beam to vary the cutting angle of the cutter, and means operated by the last mentioned means to indicate the extent of adjustment of the beam and the length of cut which will be made by the cutter.

2. In a machine for cutting material into strips, a support for material to be cut, a traveling beam mounted for movement along said support and also mounted for guided movement to different angular positions with respect to said support, a cutter mounted on said beam for longitudinal movement thereon, for the purpose of cutting the material on a bias, means operable to accurately adjust the beam to vary the cutting angle of the cutter, and means operable to hold the beam in the different angular positions to which it is moved.

3. In a machine for cutting material into strips, a support for the material to be cut, a carriage which travels relatively to said support, cutting means arranged on said carriage for travel therewith and for travel relatively thereto, for the purpose of cutting the material at intervals on a bias, and means to adjust the cutting means to vary the cutting angle thereof, for the purpose of producing strips of various lengths.

4. In a machine for cutting material into strips, a support for the material to be cut, a carriage which travels relatively to said support, a beam pivotally mounted on said carriage, cutting means arranged on said beam for travel relatively thereto for the purpose of cutting the material at intervals on a bias, and means to move and to hold the beam in various angular positions, so that the cutting means may operate for the purpose of producing strips of various lengths.

Signed at 47 Fulton St., in the county of N. Y., and State of New York, this 21st day of June, A. D. 1928.

WILLIAM R. BARRETT.